Nov. 11, 1969  T. L. DALE  3,477,179
METHOD AND APPARATUS FOR RENEWING USED OR WORN
WINDSHIELD WIPER BLADES
Filed June 6, 1967  4 Sheets-Sheet 1

INVENTOR.
THOMAS L. DALE
BY
Schmieding & Fultz
ATTORNEYS

Nov. 11, 1969     T. L. DALE     3,477,179
METHOD AND APPARATUS FOR RENEWING USED OR WORN
WINDSHIELD WIPER BLADES
Filed June 6, 1967     4 Sheets-Sheet 2

INVENTOR.
THOMAS L. DALE
BY
Schmieding & Fults
ATTORNEYS

Nov. 11, 1969       T. L. DALE            3,477,179
      METHOD AND APPARATUS FOR RENEWING USED OR WORN
                    WINDSHIELD WIPER BLADES
Filed June 6, 1967                        4 Sheets-Sheet 4
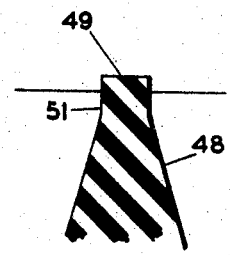
FIG. 9
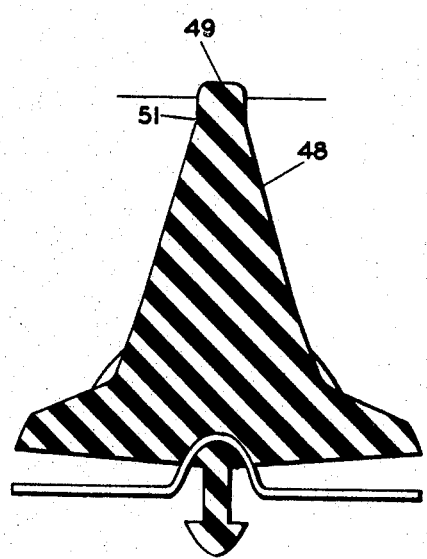
FIG. 10
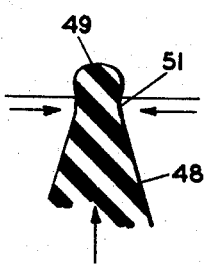   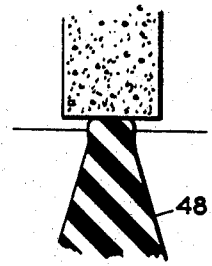   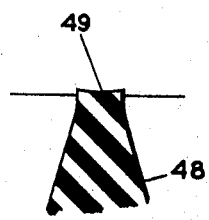
FIG. 11          FIG. 12          FIG. 13
INVENTOR.
*THOMAS L. DALE*
BY
*Schnieding + Fultz*
ATTORNEYS

United States Patent Office 3,477,179
Patented Nov. 11, 1969

---

3,477,179
METHOD AND APPARATUS FOR RENEWING USED OR WORN WINDSHIELD WIPER BLADES
Thomas L. Dale, 5193 Mapleridge Drive,
Columbus, Ohio 43227
Filed June 6, 1967, Ser. No. 643,855
Int. Cl. B24b 7/00, 9/00, 41/06
U.S. Cl. 51—34                                          4 Claims

---

ABSTRACT OF THE DISCLOSURE

An apparatus for renewing windshield wiper blades comprising a jig or blade holder and a movably mounted abrasion wheel. The jig is characterized by a blade holding recess formed by a vertically movable blade receiving groove and a pair of fixed confronting inwardly tapered side portions which together generally conform to the shape of a wiper blade. The upper edges of the side portions define a slot for receiving the wiping edge of a wiper blade. Upon upward movement of the groove and the wiper blade disposed therein, the tapered side portions of the blade are moved into force transmitting engagement with the tapered side portions of the jig and the wiping edge of the blade is extended through the slot. The abrasion wheel then may be moved along the length of the wiping edge to remove the old edge portion and form a new wiping edge.

---

The present invention relates generally to a method and apparatus for renewing used or worn windshield wiper blades and particularly to an improved method and apparatus which renews the blade edge such that it has a slightly concave wiping edge.

In general, the apparatus of the present invention comprises a jig or blade holding means and a movably mounted abrasion wheel mounted on a base. The holding means uniquely applies pressure on all areas of the resilient wiper blade except for the wiping edge which causes the wiping edge to bulge upwardly. The abrasion wheel is then moved along the length of the wiping edge to remove the worn edge surface and produce a slightly concave wiping edge when the blade is removed from the jig and the pressure is released.

New windshield wiper blades, after a relatively short period of use, become worn and begin to cause streaks on the windshield. This streaking is due to the rough and uneven edge or the rounded edges of the worn blade. Further, oxidation of the rubber blade tends to shorten the life span of the wiping edge of the blade as the oxidized rubber at the wiping edge removes any well defined, sharp contours which are necessary to efficiently wipe the windshield. Since a new set of wiper blades are relatively expensive, there is a need for an apparatus which will renew worn blades in a simple, quick, and economical manner.

It is therefore an object of the present invention to provide an apparatus for renewing used windshield wiper blades which in removing the worn wiping edge leaves a sharp, well-defined wiping edge in its place.

It is another object of the present invention to provide an apparatus of the type described which not only renews the old, worn wiping edge but makes a new wiping edge which is more efficient and longer lasting than the original wiper edge.

It is another object of the present invention to provide an apparatus of the type described wherein a novel slightly concave wiping edge is provided in an economical manner on worn wiper blades which is superior to the original edge when it was new.

It is still another object of the present invention to provide an apparatus of the type described which is relatively simple in construction and operation and which may be manufactured at low cost.

Further objects and advantages of the present invention will be apparent from the following description, reference being had to the accompanying drawings wherein a preferred form of embodiment of the invention is clearly shown.

In the drawings:

FIG. 9 is a partial side elevational view of a conventional windshield wiper blade illustrating the configuration of an original unused wiping edge;

FIG. 10 is an elevational view of a conventional wiper blade illustrating a typical configuration of a used wiping edge;

FIG. 11 is a partial side elevational view of a conventional wiper blade illustrating the configuration of a used wiping edge when subjected to pressure such as achieved with the jig of the present invention;

FIG. 12 is a view similar to the view of FIG. 11, illustrating the wiping edge shown in FIG. 11 being ground by an abrasion means; and FIG. 13 is a view similar to the view of FIG. 11 but illustrating the configuration of the wiping edge after being renewed in accordance with the present invention.

Figure 1:
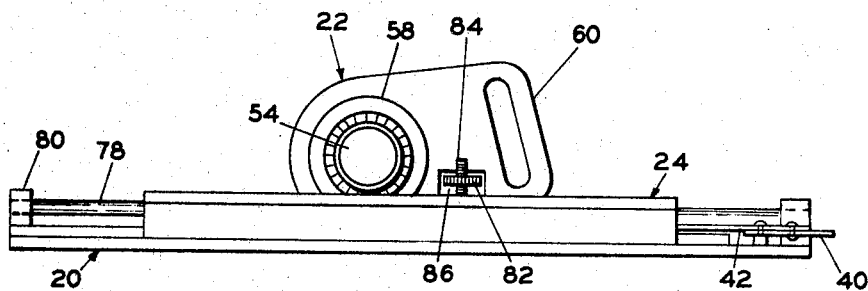
FIG. 1 is a front elevational view of an apparatus for renewing worn windshield wiper blades constructed in accordance with the present invention.

Referring in detail to the drawings, an apparatus for renewing used windshield wiper blades is illustrated in FIG. 1 and includes a base, indicated generally at 20, which supports an abrasion means, indicated generally at 22 and a blade holding jig, indicated generally at 24.

Figure 6:
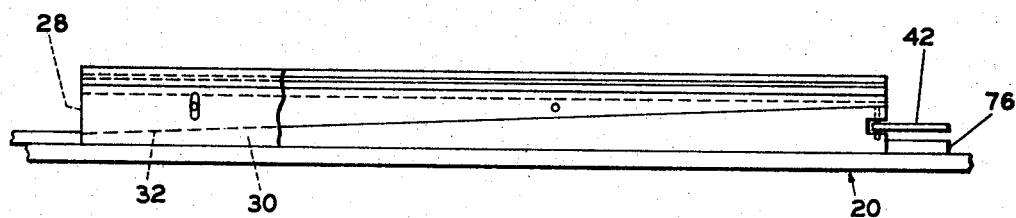
FIG. 6 is a front elevational view partially in section of a portion of the apparatus shown in FIG. 1 and illustrating the blade holding portion of the present invention.
Figure 7:
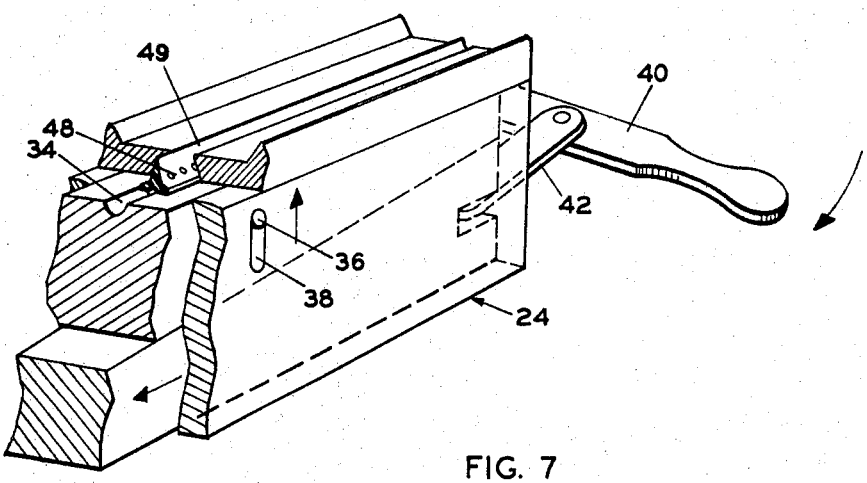
FIGS. 7 and 8 are perspective views of a portion of the apparatus of FIG. 1 and illustrate the operation of the blade holding portion of the present invention.
Figure 8:
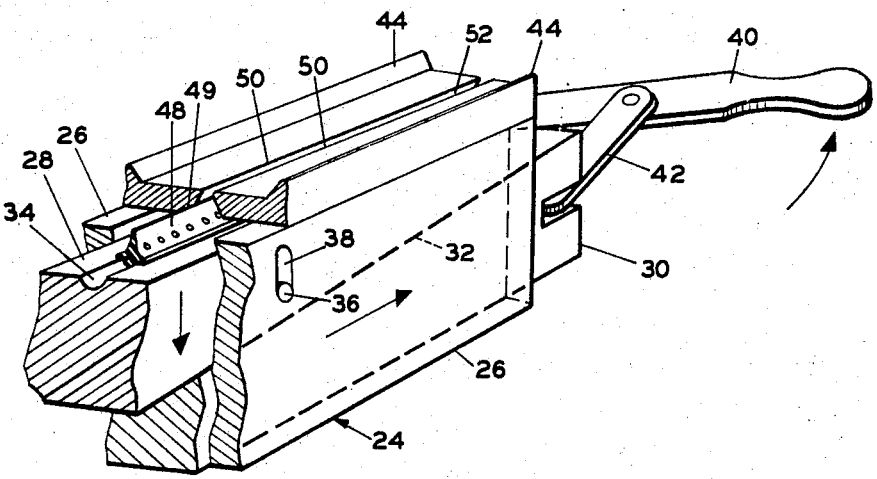

As best seen in FIGS. 6, 7, and 8, jig 24 includes a pair of guides 26 in which are mounted a pair of movably mounted wedges 28 and 30 having slanted surfaces confronting one another at 32.

The upper wedge 28 includes a recess 34 which is adapted to receive the base portion of a wiper blade and a peg 36 which is mounted in a slot 38 provided in one of the guides 26 to limit the vertical travel of wedge 28.

Lower wedge 30 is provided with a actuating means in the form of a lever 40 pivotally mounted at one end to base 20 and a link 42 pivotally mounted at one end to wedge 30 and at the other end to lever 40.

The upper portion of guides 26 is provided with two members 44 which form a blade holding and conditioning means.

Figure 3:
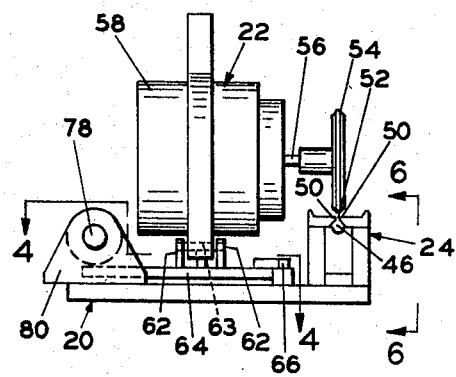
FIG. 3 is a side elevational view of the apparatus shown in FIG. 1.

Members 44 include confronting inwardly tapered surfaces which form a blade receiving recess 46 generally conforming to the shape of the upper portion of a wiper blade 48 as best seen in FIG. 3. The inwardly facing leading edges 50 of members 44 form a uniform slot or aperture 52. Wedge 28 includes a groove which receives the lower portion of a conventional wiper blade.

The distance between leading edges 50 forming slot 52 is slightly smaller than the width of the portion of wiper blade 48 adjacent the wiper edge 49 such that as the blade 48 is forced upwardly and the wiping edge 49 extends through slot 50, pressure is applied to the sloping sides of the wiper blade 49 and in the area 51 adjacent wiping edge 49. This pressure causes wiping edge 49 to bulge upwardly as illustrated in FIG. 11.

Figure 2:
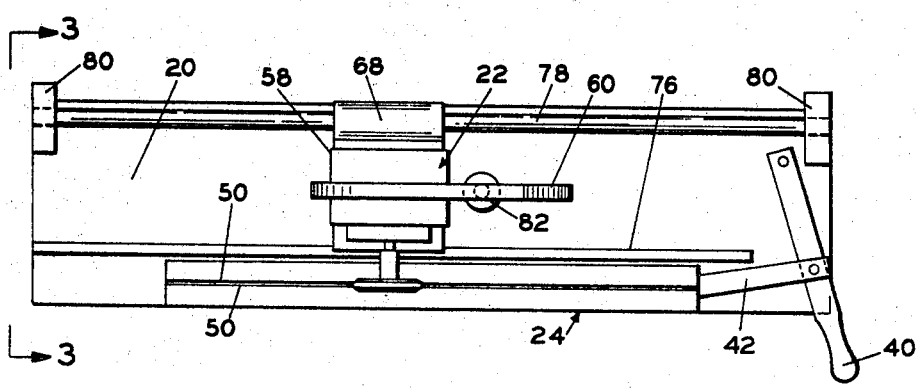
FIG. 2 is a top plan view of the apparatus shown in FIG. 1.

Now referring to FIGS. 1, 2, and 3, abrasion means 22 includes an abrasion wheel 54 rotatably mounted on a shaft 56 driven by a conventional electric motor, not shown, mounted in a housing 58.

Housing 58 is provided with a handle or grip portion 60 which is pivotally mounted on a pair of flanges 62 by a pivot pin which in turn are rigidly connected to a platform 64.

Figure 4:
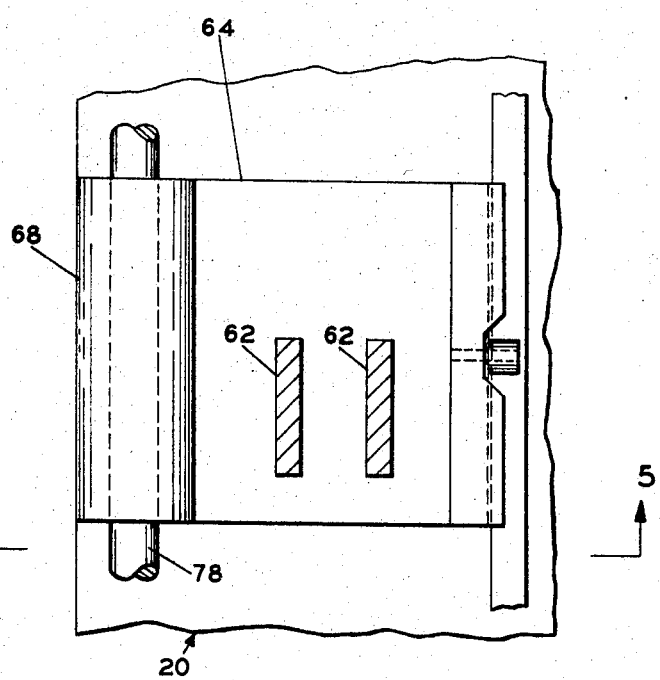
FIG. 4 is an enlarged partial sectional view of the apparatus shown in FIG. 1, the section being taken along line 4—4 in FIG. 3.
Figure 5:
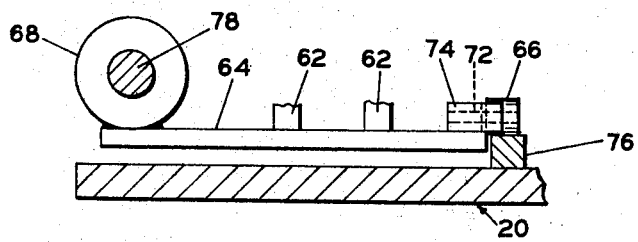
FIG. 5 is an enlarged partial sectional view of the apparatus shown in FIG. 1, the section being taken along line 5—5 in FIG. 3.

Platform 64 is slideably mounted on base means 20 by a pair of bearing members 66 and 68, best seen in FIGS. 4 and 5.

Bearing member 66 is in the form of a wheel rotatably mounted by pin 72 to a shoulder 74 which is rigidly fastened to platform 64. Wheel 66 freely rolls along the upper surface of a platform guide 76.

Bearing 68 is slideably mounted on a shaft 78 rigidly fastened to shaft mounting members 80 which in turn are connected to base 20.

Bearing members 66 and 68 provide for accurate level travel of the abrasion wheel 54 along slot 52.

Abrasion means 22 includes a height adjustment feature in the form of a manual adjustable knob 82 threadably mounted on a threaded pin 84 vertically disposed in an opening 86 provided in handle 60. The lower end of pin 84 engages platform 64. Pin 84 is eccentrically disposed with respect to pivot pin 63 so that upon manipulation of knob 84, housing 58 is rotated about pin 63 which also raises or lowers wheel 54 with respect to slot 52. In this manner the amount of rubber removed from wiping edge 49 may be varied according to the condition thereof.

In operation, the user first connects the motor within housing 58 to a source of electric power and pivots handle 40 to the right as viewed in FIG. 8. This action of handle 40 causes lower wedge 30 to move to the right and upper wedge 28 to lower with respect to slot 52.

Then a used wiper blade is slideably inserted into recess 46 with the wiper edge 49 disposed just below slot 52. Next, handle 40 is pivoted to the left from the position of FIG. 8 to the position shown in FIG. 9. This slides lower wedge 30 to the left which causes upper wedge 28 to move upwardly. The wiper edge 49 of blade 48 is then forced upwardly through slot 52 with the tapered side portions contacting the corresponding slanted surfaces of blade guides 44. Since the upper portion of recess 46 and slot 52 is slightly smaller than the dimensions of blade 48 in the general area 51 adjacent wiper edge 49, pressure is applied to substantially all areas of blade 48 except the uppermost portion of wiping edge 49 which causes the top of wiping edge 49 to bulge or protrude upwardly as viewed in FIG. 11.

Then abrasion wheel 54 is manually moved along slot 52 in contact with wiping edge 49 as illustrated in FIG. 12 to remove high or low portions of the worn wiping edge to produce a new wiping edge.

When handle 40 is pivoted to the right, lower wedge 30 also moves to the right and upper wedge 28 is lowered. Blade 48 may then be removed from recess 46. However, it is important to point out that because wiping edge 49 was caused to bulge or protrude upwardly before being ground by abrasion wheel 54, it assumes a slightly concave configuration as illustrated in FIG. 13 when removed from jig 24 since the pressure applied therein is released. This new wiping edge 49 is not only renewed by removing the worn portion thereof, but it also takes on a new configuration which is more efficient and longer lasting than the original wiping edge.

If desired, the worn blade may be subjected to freezing temperatures to harden the resilient material just before being inserted into the jig 24. This hardening permits a smoother cut and sharper edges to be made and further lessens any tendency of the resilient material of the blade to roll up in front of the abrasion wheel. Also, the small particles which are ground off the blade are less likely to adhere to the blade.

It should be pointed out that it is highly desirable and preferred to apply pressure to the blade in the manner described before grinding to assure that the renewed wiping edge assumes a concave configuration. However, a very good wiping edge may be achieved if pressure is not applied but the blade is merely held secure. The top of the wiping edge would then assume merely a straight or flat configuration with the sides at right angles. However, this flat configuration will not last as long as the concave configuration so it is not as desirable. This is true because as the wiping edges wear slightly, the concave configuration will assume a substantially flat configuration and still wipe the windshield efficiently. However, when the edges of a blade with the flat configuration becomes worn, no well defined edges are left as the blade actually assumes more of a convex configuration having rounded edges. These rounded edges are one of the factors which produce streaking and therefore inefficient wiping of the windshield.

Further, it should be noted that pitting sometimes occurs along the sides of wiping edge 49 and if this occurs, it then may be desirable to slideably mount a pair of grinding wheels ahead of wheel 22. The wheels could be adapted to grind new side surfaces to remove pitts which might leave round spots in the wiping edge if not first removed.

Also, if the pitting is extremely bad, it would be possible to actually grind away part of the tapered sides of the blade 48 itself and produce a completely new wiping edge having three ground surfaces.

While the form of embodiment of the present invention as herein disclosed constitutes a preferred form, it is to be understood that other forms might be adopted, all coming within the scope of the claims which follow.

I claim:

1. An apparatus for renewing the wiping edge of a worn windshield wiper blade comprising, in combination, a base; a jig mounted on said base and including a wiper blade receiving groove and a blade guide having a pair of confronting inwardly tapered side portions extending substantially along the length of said groove and generally to the shape of the tapered side portions of a conventional wiper blade, the upper edges of said tapered side portions of said blade guide defining a slot disposed directly over said blade receiving groove for receiving the wiping edge of a wiper blade; means for raising and lowering said blade receiving groove and a wiper blade mounted in said groove to extend or retract the wiping edge of said blade through said slot and to move the tapered side portion of the wiper blade mounted in said groove into and out of force transmitting engagement with said tapered side portions of said blade guide; and abrasion means mounted for horizontal movement on said base parallel to the length of and directly over said slot for engagement with a wiping edge of a wiper blade extended above said slot.

2. The apparatus defined in claim 1 wherein the width of said slot is slightly less than the width of the tapered side portions of said wiper blade near the wiping edge.

3. The apparatus defined in claim 1 wherein said cutting means is movably mounted on said base by first and second bearing members, said first bearing member being slideably mounted on a shaft which is fastened on said base and second bearing member making rolling contact with a portion of said base.

4. The apparatus defined in claim 1 wherein said cutting means includes height adjusting means for varying the depth of material removed from said wiping edge.

References Cited

UNITED STATES PATENTS

| | | | |
|---|---|---|---|
| 3,397,491 | 8/1968 | Keith | 51—217 X |
| 2,627,142 | 2/1953 | Pickel | 51—34.2 X |
| 1,845,908 | 2/1932 | Cover | 51—217 X |
| 3,114,222 | 12/1963 | Elford | 51—217 X |

JAMES L. JONES, Jr., Primary Examiner

U.S. Cl. X.R.

51—217